(12) United States Patent
Sharma et al.

(10) Patent No.: US 8,120,812 B2
(45) Date of Patent: Feb. 21, 2012

(54) SYSTEM AND METHOD FOR OBTAINING COLOR CONSISTENCY FOR A COLOR PRINT JOB ACROSS MULTIPLE OUTPUT DEVICES

(75) Inventors: Gaurav Sharma, Webster, NY (US); Raja Bala, Webster, NY (US); Robert J. Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2262 days.

(21) Appl. No.: 10/640,835

(22) Filed: Aug. 14, 2003

(65) Prior Publication Data
US 2005/0036159 A1 Feb. 17, 2005

(51) Int. Cl.
*G06F 15/00* (2006.01)
(52) U.S. Cl. ......... 358/1.9; 358/406; 358/504; 358/518; 347/19; 382/167
(58) Field of Classification Search .................. 358/1.9, 358/406, 504, 518; 347/19; 382/167
See application file for complete search history.

(56) References Cited

U.S. PATENT DOCUMENTS

| | | | |
|---|---|---|---|
| 5,416,890 A * | 5/1995 | Beretta | 345/590 |
| 5,502,580 A * | 3/1996 | Yoda et al. | 358/518 |
| 5,537,516 A | 7/1996 | Sherman et al. | |
| 5,604,610 A * | 2/1997 | Spaulding et al. | 358/525 |
| 5,611,030 A * | 3/1997 | Stokes | 345/590 |
| 5,710,872 A * | 1/1998 | Takahashi et al. | 358/1.9 |
| 5,719,956 A | 2/1998 | Ogatsu et al. | |
| 5,731,818 A * | 3/1998 | Wan et al. | 345/590 |
| 5,739,927 A | 4/1998 | Balasubramanian et al. | |
| 5,748,858 A * | 5/1998 | Ohtsuka et al. | 358/1.9 |
| 5,764,387 A | 6/1998 | Yamada | |
| 5,872,898 A * | 2/1999 | Mahy | 358/1.9 |
| 5,881,211 A | 3/1999 | Matsumura | |
| 5,960,110 A | 9/1999 | Usami | |
| 5,987,167 A * | 11/1999 | Inoue | 382/167 |
| 6,043,909 A | 3/2000 | Holub | |
| 6,072,464 A * | 6/2000 | Ozeki | 345/603 |
| 6,151,135 A | 11/2000 | Tanaka et al. | |
| 6,157,469 A | 12/2000 | Mestha | |
| 6,157,735 A | 12/2000 | Holub | |
| 6,160,968 A | 12/2000 | Noda | |
| 6,226,103 B1 * | 5/2001 | Klassen et al. | 358/1.9 |
| 6,344,902 B1 | 2/2002 | Duke et al. | |
| 6,377,366 B1 * | 4/2002 | Usami | 358/520 |

(Continued)

OTHER PUBLICATIONS

Pending U.S. Appl. No. 09/566,291, filed May 5, 2000, entitled On-Line Calibration System for a Dynamically Varying Color Marking Devic.

(Continued)

*Primary Examiner* — Mark K Zimmerman
*Assistant Examiner* — Jacky X Zheng

(57) ABSTRACT

A method for maintaining color consistency in an environment of networked devices is disclosed. The method involves identifying a group of devices to which a job is intended to be rendered; obtaining color characteristics from devices in the identified group; modifying the job based on the obtained color characteristics; and rendering the job on one or more of the devices. Modifications are computed by a transform determined by using the color characteristics of the output devices along with the content of the job itself. The method further maps colors in the original job to the output devices' common gamut, i.e., intersection of the gamuts of the individual printers wherein the color gamut of each device is obtained from a device characterization profile either by retrieving the gamut tag or by derivation using the characterization data in the profile.

36 Claims, 1 Drawing Sheet

U.S. PATENT DOCUMENTS

| | | |
|---|---|---|
| 6,396,595 B1 | 5/2002 | Shimazaki |
| 6,628,822 B1 * | 9/2003 | Nakabayashi et al. ......... 382/162 |
| 6,636,628 B1 | 10/2003 | Wang |
| 6,678,068 B1 | 1/2004 | Richter et al. |
| 6,870,636 B2 * | 3/2005 | Kulkarni ........................ 358/1.9 |
| 6,947,163 B2 | 9/2005 | Takemura |
| 7,024,034 B2 * | 4/2006 | Kim et al. ...................... 382/162 |
| 7,090,417 B2 | 8/2006 | Roztocil et al. |
| 7,180,632 B2 * | 2/2007 | Kanai et al. ..................... 358/1.9 |
| 7,193,746 B2 * | 3/2007 | Kanai ............................. 358/1.9 |
| 7,199,900 B2 | 4/2007 | Ogatsu et al. |
| 2003/0072016 A1 | 4/2003 | Dalrymple et al. |
| 2004/0196475 A1 * | 10/2004 | Zeng et al. ..................... 358/1.9 |

OTHER PUBLICATIONS

R. Balasubramanian, "Refinement of Printer Transformations Using Weighted Regression", SPIE vol. 2658, pp. 334-340 (1996).

Abbreviated Journal Title: "Jsuanji Xuebao", Maozu Guo, et al. Chinese Journal of Computers, vol. 23. No. 8, Aug. 2000, pp. 819-823.

"Sequential Linear Interpolation of Multi-Dimensional Functions", Allebach, et al., IEEE Trans on Image Processing, vol. 6, No. 9, Sep. 1997.

* cited by examiner

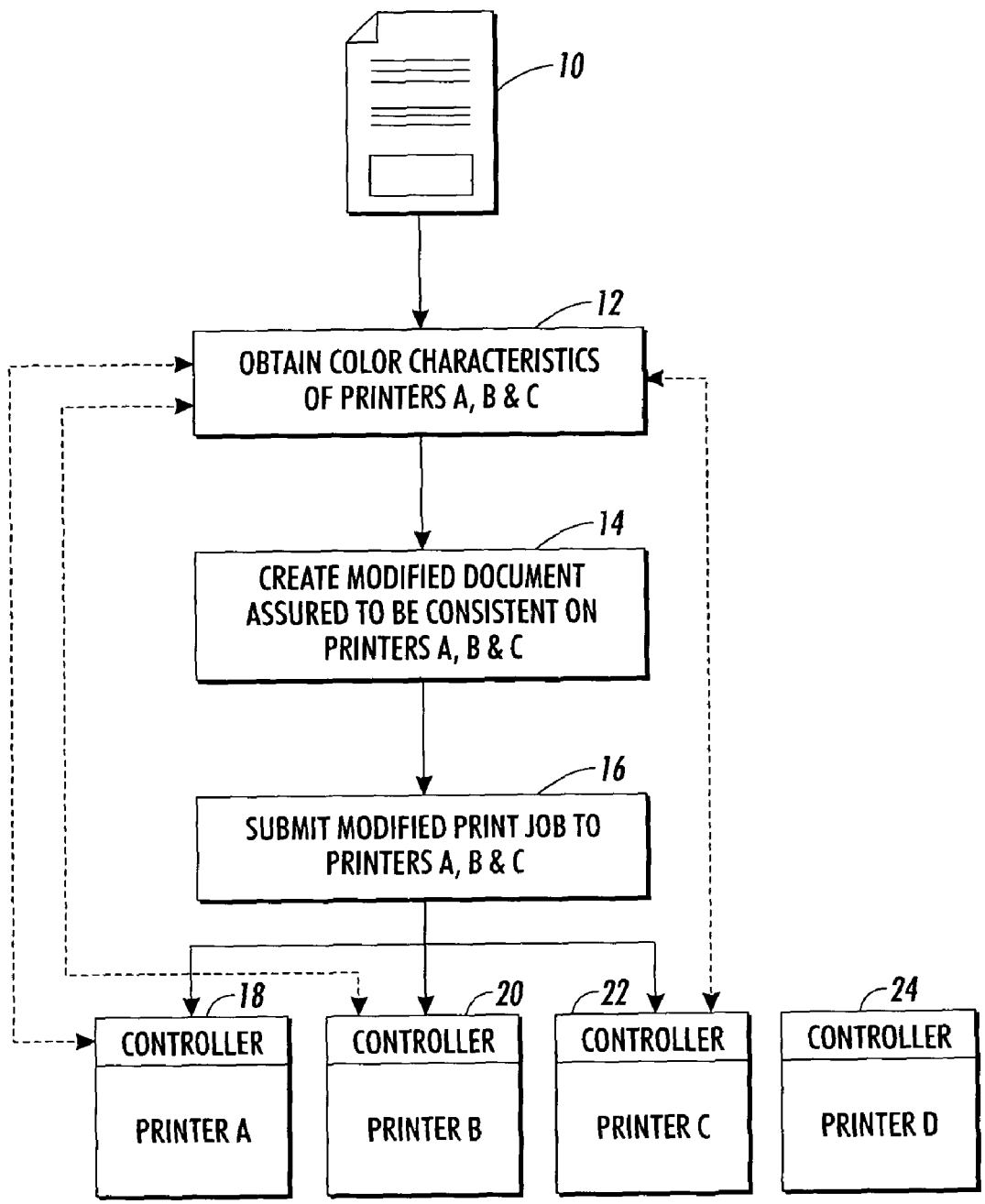

SYSTEM AND METHOD FOR OBTAINING COLOR CONSISTENCY FOR A COLOR PRINT JOB ACROSS MULTIPLE OUTPUT DEVICES

RELATED APPLICATIONS

Cross reference is made to the following copending application being filed concurrently: Ser. No. 10/641,205, entitled "A SYSTEM AND METHOD FOR SELECTING THE BEST SET OF DEVICES FOR RENDERING COLOR DOCUMENTS", by Gaurav Sharma et al.; and U.S. application Ser. No. 10/465,457, filed Jun. 19, 2003, entitled "A METHOD FOR STANDARDIZING INPUT CMYK VALUES FOR CLUSTERED PRINTING ENVIRONMENTS", by Lalit K. Mestha, et al.

FIELD OF THE INVENTION

The present invention generally relates to the field of color rendering and, more particularly, to methods to ensure color consistency across a plurality of output devices.

BACKGROUND OF THE INVENTION

In digital color publishing applications it is often desirable to distribute the rendering of a job on multiple devices which may or may not be physically co-located. In this patent, the term "devices" generally refers both hardcopy devices (i.e. printers) and softcopy display devices. For example, in cluster printing a color job might be split among multiple co-located printers in order to meet deadlines, reduce cost, or optimize overall print shop capacity.

Distributed printing from a centralized repository close to the final site of delivery is another scenario where rendering is split among multiple printers; which are not physically co-located. It will often be crucial that color reproduction amongst separate devices be highly consistent as color characteristics vary widely across devices and device controllers. Proper color management is thus needed to ensure color consistency.

One approach is to associate color correction (e.g., ICC) profiles with each output device. The profiles are derived independently for each device and loaded statically into the job management system. The colors of the input job are mapped to a device-independent color space (e.g., CIELAB) and color-corrected to the output device's profile prior to rendering. Such an approach can be found in U.S. Pat. Nos. 6,043,909 and 6,157,735 wherein a system for controlling and distributing color in a networked environment is disclosed. Both teach the concept of a "Virtual Proof", an abstract data structure that contains and manages the color profiles for each device in the system as well as the associated color-correction transformations to be applied to the input job. Although the use of device-independent color specification and profiles for color rendition on an output device is an improvement in the arts for device specific representation, this does not guarantee consistent color reproduction in certain applications involving multiple output devices.

Another problem arises from the fact that different output devices have different color gamuts. The gamut of an output device is defined as the region of colors in a device independent color space that can be reproduced on that device. In addition, the effective color gamut of a printer is often dependent on the various choices of image path elements such as ink-limit, gray component replacement (GCR), and halftones in instances where printers with different sets of image path elements represent different output devices. Standard color management approaches can only guarantee consistent color reproduction for colors in the job that are already within a color gamut common to all the output devices. The common gamut is the intersection of the individual device gamuts computed in a device independent color space. It is common for jobs to contain colors outside this common gamut. For example, consider a business graphic containing the primary colors of a display to be reproduced on multiple printers. Typically these colors are outside the gamut of all the printers and the application of independent color correction transforms does not guarantee consistent output among the devices. Differences can also be seen in saturated colors in pictorial images.

One potential solution to the problem of color consistency across multiple devices is to define a universal consistent color mode for all devices that ensures consistency across the different devices. For example, a universal consistent color mode may be achieved by restricting the colors for all output devices to the common gamut of the universe of devices employed. In order to be more useful, temporal variations among devices and differences across devices should be comprehended in computing the common gamut. Color critical jobs may then be rendered using the consistent mode to ensure that some inter-device differences do not unduly affect the color rendering of the job. This approach however has several limitations. One is that the restriction to the common gamut over time and across devices often exacts an unnecessary penalty in image quality. Even for a single device family, a significant region of the dynamic range may need to be sacrificed in order to achieve consistency over the fleet and over time. In addition, this does not scale well as new devices are introduced or older devices are removed. The introduction of a new device or removal of an existing device often requires an upgrade of the "consistent-mode" corrections at all existing devices. Lastly, upon re-calibration and re-characterization of a device, each existing device should be updated.

BRIEF SUMMARY

A method for maintaining color consistency in an environment of networked devices is disclosed. The method involves identifying a group of devices to which a job is intended to be rendered; obtaining color characteristics from devices in the identified group; modifying the job based on the obtained color characteristics; and rendering the job on one or more of the devices. More specifically, device controllers associated with each of the output devices are queried to obtain color characteristics specific to the associated output device. Preferably, the original job and the modified job employ device independent color descriptions. Modifications are computed by a transform determined by using the color characteristics of the output devices along with the content of the job itself. The method further comprises mapping colors in the original job to the output devices' common gamut, i.e., intersection of the gamuts of the individual printers wherein the color gamut of each device is obtained from a device characterization profile either by retrieving the gamut tag or by derivation using the characterization data in the profile. The color gamut of each device is computed with knowledge of the transforms that relate device independent color to device dependent color using a combination of device calibration and characterization information. Alternatively, transformations are determined dynamically based on the characteristics of the target group of output devices. From the individual color gamuts of the devices, a common intersection gamut is derived. The common intersection gamut derivation generally comprises an intersection of two three-dimensional volumes in color space. This may be performed geometrically by intersecting the surfaces representing the boundaries of the gamut volumes —which are typically chosen as triangles. Alternately, the intersection may be computed by generating a grid of points known to include all involved device gamuts. This is then mapped sequentially to each individual gamut in turn resulting in a set of points that lie within the common gamut to produce a connected gamut surface. Once the common intersection gamut is derived, the input job colors are mapped to this gamut. The optimal technique generally depends on the characteristics of the input job and the user's rendering intent. Final color correction employs a standard calorimetric transform for each output device that does not involve any gamut mapping.

Once the type of color data has been determined, the color characteristics are matched against the strengths of the available output devices to obtain a list of devices best suited for this particular color print job. At least one device from the list of best devices is selected and the color document is rendered onto the selected device. Preferably, the types of color data involved are determined by the mix of defined colorimetry and undefined colorimetry in the color document. Alternatively, the types of color data are determined by analyzing the colorspaces in the document (i.e., RGB, CMYK, LAB, XYZ, etc.), and the embedded profiles, if any, in the document (e.g., sRGB, SWOPCMYK, Euroscale). In the instance wherein a number of devices match the criteria for selection, only those devices which honor embedded color profiles are selected for documents containing embedded profiles. Alternatively, only those devices are selected that produce a consistent rendering across multiple color spaces and profiles for documents with a mix of color spaces and profiles. Selecting the best device may also depend on whether the type of print job is considered to be Job-Balancing or Job-Splitting. With Job-Balancing, at least one of the metrics is used: (i) Intersection Gamut Volume, (ii) Gamut Similarity, or (iii) Mismatch Between Document Colors and Intersection Gamut for device selection. With Job-Splitting, at least one of these metrics are used: (i) Individual Gamut Volume, or (ii) Mismatch Between Document Colors and Device Gamut. Colorimetric definition of the selected colors can be retrieved from either an embedded source profile or by default and mapping the colors to the output gamut.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 1 is a flow diagram of the present invention.

DETAILED DESCRIPTION OF THE INVENTION

The present invention utilizes color characteristics from the set of targeted output printing devices to modify input color jobs such that color consistency is provided throughout and maximal image quality achieved across a set of output devices.

The method involves first identifying a group of devices to which a job is intended to be rendered; obtaining color characteristics from devices in the identified group; modifying the job based on the obtained color characteristics; and rendering the job on one or more of the devices. Device controllers associated with each of the output devices are queried to obtain color characteristics specific to the associated output device. The device may comprise the raw device alone or the combination of the raw device and the controller or front-end that drives the device. Modifications are computed by a transform determined by using the color characteristics of the output devices along with the content of the job itself. The method further comprises mapping colors in the original job to the output devices' common gamut, i.e., intersection of the gamuts of the individual printers wherein the color gamut of each device is obtained from a device characterization profile either by retrieving the gamut tag or by derivation using the characterization data in the profile. The color gamut of each device is computed with knowledge of the transforms that relate device independent color to device dependent color using a combination of device calibration and characterization information. Alternatively, transformations are determined dynamically based on the characteristics of the target group of output devices. From the individual color gamuts of the devices, a common intersection gamut is derived. The common intersection gamut derivation generally comprises an intersection of two three-dimensional volumes in color space. This may be performed geometrically by intersecting the surfaces representing the boundaries of the gamut volumes —which are typically chosen as triangles. Alternately, the intersection may be computed by generating a grid of points known to include all involved device gamuts. This is then mapped sequentially to each individual gamut in turn, and potentially through multiple iterations of these sequential mappings, resulting in a set of points that lie within the common gamut to produce a connected gamut surface. Once the common intersection gamut is derived, the input job colors are mapped to this gamut. The optimal technique generally depends on the characteristics of the input job and the user's rendering intent. Final color correction employs a standard calorimetric transform for each output device that does not involve any gamut mapping.

Attention is now directed to FIG. 1, at 10, wherein a job is intended to be rendered on devices A, B, and C having device controllers 18, 20, and 22 associated wherewith. It is preferable, though not a requirement of the present invention, that the original job and the modified job employ device independent color descriptions and the final color characterization and calibration that transforms these device independent color descriptions to CMYK values resides in the controller thereof to better exploit the specialized color transformation hardware/software within the controller. This is desirable because it leaves the device color characterization and calibration at the controller. At 12, the controllers of devices A, B, and C are queried to obtain color characteristics At 14, the job intended to be output is modified to ensure consistency across output devices. Modifications made to the job may be computed using a transform determined by the color characteristics of the output devices alone (image independent mapping) wherein the transforms for commonly used sets of devices may be pre-computed or otherwise cached for efficiency and updated when a device is re-calibrated or re-characterized. Preferably, the modifications may also be computed by a transform determined by using the color characteristics of the devices along with the content of the job itself (image dependent mapping). Also, modifications thereof can be by altering embedded color transformation profiles without explicitly performing the data transformation. In particular, the modification may include imposing an interpretation for incompletely defined colors within the job for instance RGB colors with no color tags and no profile embedded.

Color consistency is obtained by mapping colors in the original job to the output devices' common gamut, i.e., intersection of the gamuts of the individual devices. The restriction to a common gamut may generally be considered unacceptable for a consistent mode for a large set of different output devices but may be acceptable in the dynamic consistency scenario when a smaller number of similar devices are involved.

The color gamut of each output device in the set of device's specified for the job is obtained from a device characterization profile, for instance an ICC profile, either by directly retrieving the gamut tag therefrom or by derivation using the characterization data in the profile, an example being the A to B0 tag in ICC profiles. If the color gamut is specified explicitly in the device's profile then the gamut is simply extracted. The profile format typically includes device gamut description. Alternatively, gamut can be computed with knowledge of the transforms that relate device independent color to device dependent color using a combination of device calibration and characterization information. Even when the prospective transformations are pre-computed and stored, the specific transformation applied is determined dynamically based on the target group of output devices.

From the individual gamuts, a common intersection gamut is computed. Several techniques are known for the computation of the common intersection gamut of multi-dimensional volumes and any of these may be applied to the computing of the intersection gamut. One approach generates a grid of points known to include all selected device gamuts. This is then mapped sequentially to each individual gamut in turn. Multiple iterations of this mapping are performed to obtain convergence. The results from performing gamut mappings in different orders are combined to ensure a correct and accurate result. The result from this sequential mapping is a set of points that lie within the common gamut. From this, a connected gamut surface is derived.

Once the common intersection gamut is derived, the colors of the job are mapped to this gamut using gamut-mapping techniques found in the arts. One skilled in this art would understand gamut-mapping. Numerous methods exist for doing this, several of which are described by Morovic, in: "Gamut mapping", *Digital Color Imaging Handbook*, Chapter 10, pages 639-686, Gaurav Sharma Ed., CRC Press, 2003.

In order to avoid inconsistencies in color output, it is desirable that all gamut mapping be completed at the stage of mapping colors to the common intersection gamut. The mapping to the common intersection comprehends the use of different rendering intents or preferred methods of mapping for different input object types, such as the perceptual intent for pictorial images, saturation intent for business graphics, and calorimetric rendering for spot and logo colors. Typically, these intents are defined within the ICC specification.

In one embodiment, in-gamut colors are unaltered and out-of-gamut colors are clipped to the nearest in-gamut color of the same hue. The resulting job, with the colors restricted to the common gamut, can then be rendered on the output devices. The final color correction preferably employs a standard colorimetric transform for each output device that does not involve any gamut mapping, (e.g., the calorimetric rendering component of the ICC profiles). The modified job, at 16, is then submitted to output devices with consistent color output.

If a fourth device D, at 24, is added to the set of available output devices, the intersection gamuts for various combinations of devices can be updated by mapping the points on the current intersection gamut surface to the gamut of the new device. Likewise if a device is removed from the set of available output devices, its gamut can removed from the gamut intersection computation. For devices within the same product family, differences in color rendition are commonly seen as variations in tone response due to variations in the darkest color that can be produced (black point/Dmax). Other differences are relatively minor due to similarity of the colorants, substrate, and imaging path elements.

An alternate embodiment is used to ensure uniform tone response across a fleet of installed devices from a family with minimal information when the known black point is used to map the tone scale of the image/input gamut to the tone scale of the output device using, for example, a lightness mapping function in CIELAB. Alternately, if the individual device responses are known either completely or partially, these can also be used to compute Tone Response Corrections (TRCs) to ensure consistency across a plurality of devices. The TRCs are applied to the cyan, magenta, yellow, and black (CMYK) separations individually and are therefore device dependent. The TRCs may be downloaded to the individual devices. The determination of suitable TRCs for downloading can be performed to achieve gray balance or to get defined response along individual separations.

Another approach is to establish a fleet black point and calibrate all devices to the established dynamic range. This has a trade-off between the capability to actually ensure consistency across output device variations and the amount of dynamic range and gamut being sacrificed for jobs designated for a single device.

Advantageously, the present invention applies color adjustments dynamically, utilizing color characteristics of the particular set of target devices of interest rather than employing a universal set of output devices. The combined characteristics of the set of target output devices is used to determine the color correction and does not involve the compromises of a universal consistent-mode. It is advantageous that the functions involving interpretation of incompletely defined color input and the reduction of the colors in the image to a common gamut as disclosed herein are centralized thus minimizing variations due to differing interpretations and to differing adjustments for preference.

Another advantage is that the color characteristics of the input job can be analyzed in order to select only those devices whose color capabilities are best suited for the task. The color attributes of the job are compared against the color attributes of the individual output devices currently available for this particular job to determine a best device or best set of devices for that job. In order to select the best device or best set of devices, the types of data included in the job need to be first determined by an analysis of the mix of defined colorimetry and undefined colorimetry, the colorspaces in the job (i.e., RGB, CMYK, LAB, XYZ, etc.), and the embedded profiles, if any, in the job (e.g., sRGB, SWOPCMYK, Euroscale). Once the type of color data has been determined, these are matched against output devices to determine potential devices best suited for this particular job. A number of devices may match the criteria for selection because devices whose default assumptions are widely preferred are better suited for a job with undefined colorimetry; devices which honor embedded color profiles are preferable for a job containing embedded profiles; and devices that produce a consistent rendering across multiple color spaces and profiles are preferred for job with a mix of color spaces and profiles. Selecting the best device depends on whether the type of job is considered to be Job-Balancing or Job-Splitting.

With Job-Balancing, the entire job is to be rendered individually on multiple output devices generally to increase throughput. As will be described herein, metrics that are relevant for this scenario are (I) Intersection Gamut Volume, (ii) Gamut Similarity, and (iii) Mismatch Between Job Colors and Intersection Gamut.

With Job-Splitting, different pages from a job are to be rendered on different devices. Since all copies of a given page are rendered on a single device, the concern of color consistency across devices is not necessarily as pertinent as determining the output device that is most suitable for rendering which pages. Metrics that apply in this scenario are (I) Individual Gamut Volume, and (ii) Mismatch Between Job Colors and Device Gamut. Intersection Gamut is not as critical since the same content is not being rendered on multiple devices.

Gamut Volume

A good indicator of the color capability of a particular output device is the volume of its gamut. As previously mentioned, color gamut can be obtained from an ICC profile either by directly retrieving the gamut tag or by derivation using the characterization data in the A to B0 tag. For a set of devices $D_1, \ldots, D_n$ having associated color gamuts $G_1, \ldots, G_n$, and $V_i$ is denoted to be the volume of $G_1$, then for typical gamuts a calculation of gamut volume can be performed by:
  a) describing a surface of a gamut with a series of triangles;
  b) selecting a central point P within the gamut, e.g., LAB= [50,0,0] for each surface triangle:
  c) defining a tetrahedron whose vertices include P and the vertices of the triangle;
  d) computing a volume of the tetrahedron; and
  e) summing all tetrahedron volumes to obtain the gamut volume.

It is intended herein that alternate techniques known in the arts for computation of gamut volume, to the extent used in the present invention, be considered within the scope hereof. Further, the scope of the present invention also covers those situations where the gamut possesses an unusual shape.

Intersection Gamut Volume

A good metric for evaluating the combined capability of output devices is the volume of the intersection gamut. The intersection of two gamuts $G_i$ and $G_j$ is given by $G_{ij}=G_i \cap G_j$ where $V_{ij}$ is the volume of $G_{ij}$.

Gamut Similarity

Gamut Similarity provides a good indication of the compromises to achieve consistency across devices. The larger the value, the greater the similarity and hence the lesser the compromise. The similarity between two gamuts, is given by:

$$S_{ij} = \frac{V_{ij}}{\max(V_i, V_j)}$$

where $S_{ij}$ lies in the range [0, 1], with 0 corresponding to no gamut overlap, and 1 corresponding to identical gamuts. Since the denominator is the maximum of the individual gamut volumes, this provides a worst-case indicator of gamut similarity. This can also be extended to the case of more than two gamuts thus providing a single similarity metric for an arbitrary number of devices.

Mismatch Between Job Colors and Device Gamut

The average or maximum $\Delta E$ can serve as an indicator of mismatch between job and device gamut. This involves first computing a $\Delta E$ metric (e.g., $\Delta E_{94}$) between input and gamut-mapped colors. Colors in the job that are likely to lie outside an output device's color gamut (e.g., dark and/or high-chroma colors) are identified. If the job is a raster then a histogram analysis can be used to select those dark and high-chroma colors with a significant frequency of occurrence. If the job is in a vector representation, information about color and frequency of occurrence may be more directly available.

Alternatively, the job could be presented in a Graphical User Interface enabling the user to select important colors. The calorimetric definition of the selected colors is retrieved from either an embedded source profile or by default and the colors are mapped to the output gamut. This is either the individual gamut of a device or the intersection gamut of a collection of devices. In one embodiment, gamut mapping clips out-of-gamut colors to the nearest color on the gamut surface while leaving in-gamut colors unaltered. It is intended herein that many methods of gamut mapping known in the arts fall within the scope of the present invention.

While the present invention has been described with reference being made specifically to color devices, it is also applicable to black and white devices.

Finally, while the preferred embodiment envisions a system employing a plurality of varying printing devices, it is envisioned herein that this invention also finds its uses in softcopy display devices which utilize soft-proofing methods to make color decisions and to those systems where the job is available to the end user in both hardcopy and softcopy forms and color consistency is required between the softcopy and hardcopy renditions.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for maintaining color consistency in an environment of output devices comprising:
   identifying a plurality of devices on which a job is to be rendered;
   obtaining a plurality of sets of color characteristics, each set of color characteristics being from one of the identified devices;
   determining, based upon the plurality of sets of color characteristics, a set of parameters to modify the job for consistency across the identified devices;
   modifying the job according to the set of parameters; and
   rendering, at the plurality of identified devices, the modified job.

2. The method of claim 1 using device controllers associated with the identified devices for obtaining a set of color characteristics therefor.

3. The method of claim 1 wherein the job and the modified job employ device independent color descriptions.

4. The method of claim 1 wherein the modified job employs device dependent color descriptions specific to the identified devices.

5. The method of claim 1 wherein the parameters comprise a color transformation determined by color characteristics of each of the identified devices.

6. The method of claim 5 wherein the color transform is pre-computed, cached, and updated when the output devices are re-calibrated or re-characterized.

7. The method of claim 5 wherein the parameters being also determined by the content of the job.

8. The method of claim 1 further comprising mapping colors in the job to an intersection of color gamuts for each individual identified devices.

9. The method of claim 8 wherein the color gamut of each of the identified devices is obtained from either a color gamut identification data or device characterization data.

10. The method of claim 8 wherein the color gamut of each of the identified devices is obtained from a device characterization profile which includes color gamut information.

11. The method of claim 10 wherein the mapping clips colors located outside a color gamut to a boundary of the color gamut and leaves colors located inside a color gamut unaltered.

12. The method of claim 1 wherein a color gamut for each of the identified devices is computed using transforms relating device independent color to device dependent color using a combination of device calibration and characterization information.

13. The method of claim 12 wherein the color transforms are based on characteristics of a pre-determined group of the identified devices.

14. The method of claim 1 further comprising deriving a color gamut intersection common to color gamuts from each individual identified device.

15. The method of claim 14, once the color gamut intersection common to color gamuts from individual output devices is derived, mapping colors of the job to this color gamut.

16. The method of claim 1 further comprising using a black point in the job to map a tone scale of a color gamut of the job to a tone scale of a color gamut of each identified device to ensure uniform tone response across devices.

17. The method of claim 16 wherein a lightness mapping function in CIELAB is utilized.

18. The method of claim 1 further comprising querying the output device to obtain color characteristics specific to the identified device.

19. A system for maintaining color consistency in an environment of networked devices comprising:
a computer in communication with a plurality of output devices;
a processor, and software and hardware resources sufficient to perform the tasks of:
identifying a plurality of output devices on which a job is to be rendered;
obtaining a plurality of sets of color characteristics, each set of color characteristics being from one of the identified output devices;
determining, based upon the plurality of sets of color characteristics, a set of parameters to modify the job for consistency across the identified output devices;
modifying the job according to the set of parameters; and
rendering, at the plurality of identified devices, the modified job.

20. The system of claim 19 using device controllers associated with at least one of the identified output devices for obtaining a set of color characteristics therefor.

21. The system of claim 19 wherein the job and the modified job employ device independent color descriptions.

22. The system of claim 19 wherein the modified job employs device dependent color descriptions specific to the identified output devices.

23. The system of claim 19 wherein the parameters comprise a color transformation determined by color characteristics of at least one of the identified output devices.

24. The system of claim 23 wherein the color transform is pre-computed, cached, and updated when the identified output devices are re-calibrated or re-characterized.

25. The system of claim 23 wherein the parameters being also determined by the content of the job.

26. The system of claim 19 further comprising mapping colors in the job to an intersection of color gamuts of individual identified output devices.

27. The system of claim 26 wherein the color gamut of each of the identified output devices is obtained from either a color gamut identification data or device characterization data.

28. The system of claim 26 wherein the color gamut of each of the identified output devices is obtained from a device characterization profile which includes color gamut information.

29. The system of claim 28 wherein the mapping clips colors located outside a color gamut to a boundary of the color gamut and leaves colors located inside a color gamut unaltered.

30. The system of claim 19 wherein a color gamut for the identified output devices is computed using transforms relating device independent color to device dependent color using a combination of device calibration and characterization information.

31. The system of claim 30 wherein the color transforms are based on characteristics of a pre-determined group of the identified output devices.

32. The system of claim 19 further comprising deriving color gamut intersection common to color gamut from individual identified output devices.

33. The system of claim 32, once the color gamut intersection common to color gamuts from individual identified output devices is derived, mapping colors of the job to this color gamut.

34. The system of claim 19 further comprising using a black point of the job to map a tone scale of the color gamut of the job to the tone scale of the color gamut of each identified output device to ensure uniform tone response across devices.

35. The system of claim 34 wherein a lightness mapping function in CIELAB is utilized.

36. The system of claim 19 further comprising querying the identified output device to obtain color characteristics specific to the identified output device.

* * * * *